(12) United States Patent
Zuber

(10) Patent No.: US 10,380,850 B1
(45) Date of Patent: Aug. 13, 2019

(54) VIRTUAL CANE

(71) Applicant: Adam A. Zuber, Fort Myers, FL (US)

(72) Inventor: Adam A. Zuber, Fort Myers, FL (US)

( * ) Notice: Subject to any disclaimer, the term of this patent is extended or adjusted under 35 U.S.C. 154(b) by 0 days.

(21) Appl. No.: 15/892,903

(22) Filed: Feb. 9, 2018

(51) Int. Cl.
*G01C 21/00* (2006.01)
*G08B 6/00* (2006.01)
*G01B 11/14* (2006.01)
*G08B 21/18* (2006.01)

(52) U.S. Cl.
CPC ........... *G08B 6/00* (2013.01); *G01B 11/14* (2013.01); *G08B 21/18* (2013.01)

(58) Field of Classification Search
CPC ........... G08B 6/00; G08B 21/18; G01B 11/14
See application file for complete search history.

(56) References Cited

U.S. PATENT DOCUMENTS

| | | | | |
|---|---|---|---|---|
| 4,280,204 A * | 7/1981 | Elchinger | ............... | A61H 3/061 135/76 |
| 6,011,481 A | 1/2000 | Luther et al. | | |
| 6,671,226 B1 | 12/2003 | Finkel et al. | | |
| 7,706,212 B1 * | 4/2010 | Campbell | ............... | A61H 3/061 367/116 |
| 8,077,020 B2 | 12/2011 | Behm et al. | | |
| 8,825,389 B1 * | 9/2014 | Campbell | ............... | A61H 3/061 701/433 |
| 8,974,232 B2 | 3/2015 | Behrenbruch et al. | | |
| 9,037,400 B2 * | 5/2015 | Tolstedt | ................ | A61H 3/061 701/411 |
| 9,360,343 B2 | 6/2016 | Stevens et al. | | |
| 2006/0028544 A1 * | 2/2006 | Tseng | .................... | A61H 3/061 348/62 |
| 2012/0119920 A1 | 5/2012 | Sallop | | |
| 2013/0216981 A1 * | 8/2013 | Campbell | ............ | G09B 21/003 434/112 |
| 2013/0346021 A1 * | 12/2013 | Stevens | ................ | G01C 22/006 702/160 |
| 2014/0055229 A1 * | 2/2014 | Amedi | .................... | A61H 3/061 340/4.1 |
| 2015/0254943 A1 * | 9/2015 | Daeef | ...................... | G08B 3/10 340/539.11 |
| 2016/0300469 A1 | 10/2016 | Hood | | |
| 2017/0024010 A1 * | 1/2017 | Weinraub | ................ | G06F 3/016 |
| 2018/0078444 A1 * | 3/2018 | Gamerman | ............. | G01S 17/93 |

* cited by examiner

*Primary Examiner* — Munear T Akki
(74) *Attorney, Agent, or Firm* — Edward M. Livingtston, Esq.; Bryan L. Loeffler, Esq.; Livingston Leoffler, P.A.

(57) ABSTRACT

A virtual cane (1) wherein a handheld sensor (2) determines a position of the user's hand in relation to the ground and/or to the user's body. The handheld sensor mimics the feel of a conventional cane providing sensory feedback to the user to prevent dizziness or vertigo.

1 Claim, 3 Drawing Sheets

VIRTUAL CANE

FIELD OF THE INVENTION

This invention relates to walking aids such as canes and more particularly a virtual cane that is worn on an individual's palm and emits a physical signal to the palm of the hand to provide a sense of stability while standing and/or walking.

BACKGROUND OF THE INVENTION

Assistive canes or walking sticks are used by many elderly individuals to assist with walking and mobility.

Many individuals think canes are solely used to help redistribute weight from a lower leg that is weak or painful to the cane and the user's arm. This may be true in many instances, however, canes also improve stability in individuals who suffer from peripheral neuropathy.

As people age, the nerves conduct slower than at younger ages. Changes in nerve conduction velocity relates to lack of transmission of position of the feet relative to the surface they are standing on. This abnormality may also be is present in people with stroke, neuropathy, aging or any other myriad variety of imbalance related problems. The input requirement is minimal to provide an individual with their spatial position. That is why elderly people just need to hold an assistant's hand and do not need to push down on it.

The peripheral nervous system sends information between your brain and spinal cord (central nervous system) to the rest of your body, including the feet and legs. Peripheral neuropathy or aging is a result of damage to peripheral nerves that causes numbness in the feet. Individuals who suffer from peripheral neuropathy often feel "off balance" and/or like they are misstepping while walking because they cannot feel the ground beneath them. This unsteadiness and imbalance is a common problem for individuals suffering from peripheral neuropathy and aging.

The feeling of being off balance can be alleviated by the use of a walking cane wherein a signal is sent from the hand to the brain that the hand is in a stable position on the cane, thereby replacing the signal that would normally be sent from the individual's feet to the brain that the individual is standing in a stable position and/or not misstepping while walking.

While conventional canes are a solution to the problems caused by peripheral neuropathy or aging, many individuals refuse to use a cane as a matter of pride as they see a cane as a sign of old age, plus being cumbersome, ugly and an ancient device.

Therefore, a need exists for a virtual cane wherein a hand-held sensor provides a physical signal or stimulation to the nerves of the hand depending on the location of the sensor in relation to the ground and/or to a secondary electronic device carried on the user's body.

SUMMARY OF THE INVENTION

The primary object of the present invention is to provide a virtual cane wherein a hand-held device provides a physical signal or stimulation to the nerves of the hand depending on the location of the device in relation to the ground and/or to a fixed point of reference on the user's body.

The present invention fulfills the above and other objects by providing a virtual cane wherein a handheld sensor determines a position of the user's hand in relation to the ground and/or to the user's body. The handheld sensor may have one or more UV sensors, light sensors, proximity sensors and so forth to determine the location of the sensor at any given time. The handheld sensor is preferably worn on the user's palm of his or her hand to provide physical stimulation to the nerves located in the palm of the hand. A physical alert or stimulation, such as a vibration providing mechanism, alerts the user if the sensor is placed in a position that is outside a predetermined range of acceptable distances from the ground and or the user's body. A pressure providing mechanism may apply a constant or periodic pressure on the user's palm when the device is located within an acceptable predetermined range of distances from the ground and or the user's body. Therefore, the device mimics the feel of a conventional cane providing sensory feedback to the user to prevent unsteadiness and imbalance.

The handheld sensor may use the ground as a measurement for the location of the handheld sensor at any given time. Alternatively, a stationary device may be carried on the user's body, such as on the belt, in a pocket, on a shoe and so forth, to provide a point for measuring the location of the sensor and the user's hand. The stationary device may be carried in the user's pocket, on the user's belt or any place on the user's body where the stationary device will remain in a substantially fixed position. The stationary device then communicates via one or more signals to the handheld sensor to allow the sensor to determine a distance between the sensor and the stationary device.

The stationary device may be placed on a floor or other object in a room. For example, the stationary device may be one or more floor tiles or similar floor coverings that are placed on a floor on which a user stands or walks on.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
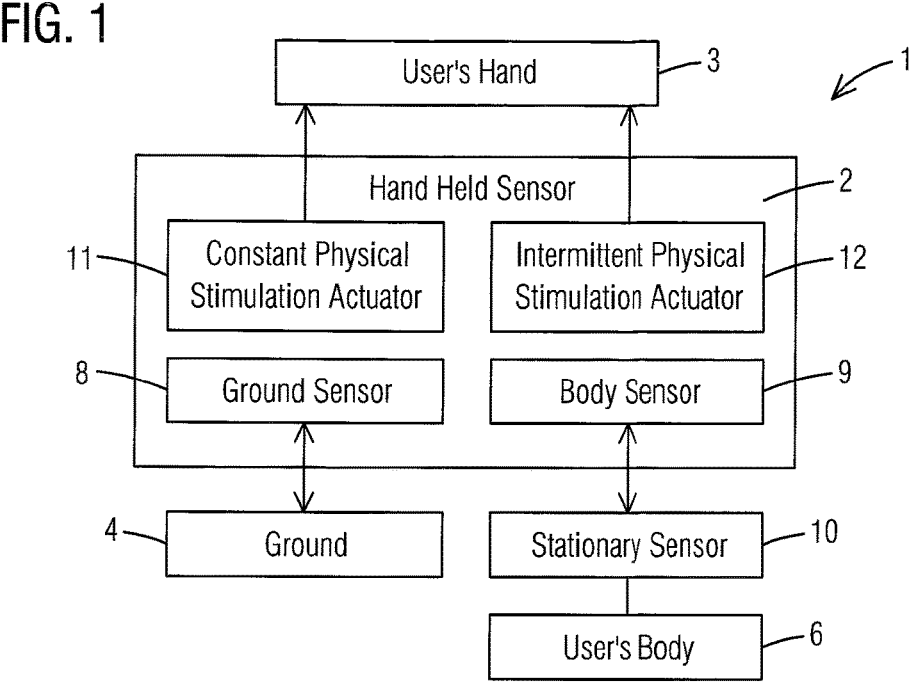
FIG. 1 is a block diagram showing components of a virtual cane of the present invention.

For purposes of describing the preferred embodiment, the terminology used in reference to the numbered accessories in the drawings is as follows:

1. virtual cane, generally
2. handheld sensor
3. user's hand 4. ground
5. fixed point of reference
6. user's body
7. attachment means
8. ground sensor
9. body sensor
10. stationary sensor
11. constant physical stimulation actuator
12. intermittent physical stimulation actuator
13. first acceptable range of distance
14. second acceptable range of distance
15. J-shaped hook
16. curved portion
17. straight portion
18. watch
19. distal end of curved portion
20. handle
21. attachment means With reference to FIG. 1, the virtual cane 1 of the present invention comprises a handheld sensor 2 that determines a position of the user's hand 3 in relation to the ground 4 and/or to a fixed point of reference 5 on a user's body 6. The handheld sensor 2 may be held in a user's palm by gripping the handheld sensor 2 and/or held against the palm of the user's hand via an attachment means 7, such as one or more straps, bracelets, rings, a glove, a J-shaped hook and so forth. The handheld sensor 2 may attach to a smart watch either physically or via wireless communication, such as Bluetooth. The handheld sensor 2 may be incorporated into a smart watch, fit bit, smart phone or similar device, that provides means for means for telephone communication and means for monitoring the user's health and vital signs.

The handheld sensor 2 may comprise at least one ground sensor 8. The at least one ground sensor 8 may comprise a UV sensor, light sensors, proximity sensor and so forth to determine the location of the handheld sensor 2 in relation to the ground 4 located beneath the user's feet on an ongoing reoccurring basis.

Alternatively or in addition to the at least one ground sensor 8, the handheld sensor 2 may comprise at least one body sensor 9 that works in correlation with a stationary sensor 10. The at least one body sensor 9 may comprise a UV sensor, light sensor, proximity sensor, Bluetooth communication, radio communication, RFID tag and so forth. Likewise, the stationary sensor 10 may also comprise a UV sensor, light sensor, proximity sensor, Bluetooth communication, radio communication, RFID tag and so forth that is in communication with the body sensor 9 to determine the location of the handheld sensor 2 in relation at all times to the stationary sensor 10, which creates a fixed point of reference 5 on the user's body 6, such as on a belt, in a pocket on a shoe and so forth. The at least one body sensor 9 may be a smart phone or other electronic device that is in electronic communication with the handheld sensor 2. An advantage of using a smart phone as the at least one body sensor 9 is the ability to alert third parties when the handheld sensor 2 falls out of an acceptable range of distance from the ground 4 and/or the stationary sensor 10 for an extended period of time, meaning the user has most likely fallen and is unable to get up.

Figure 2:
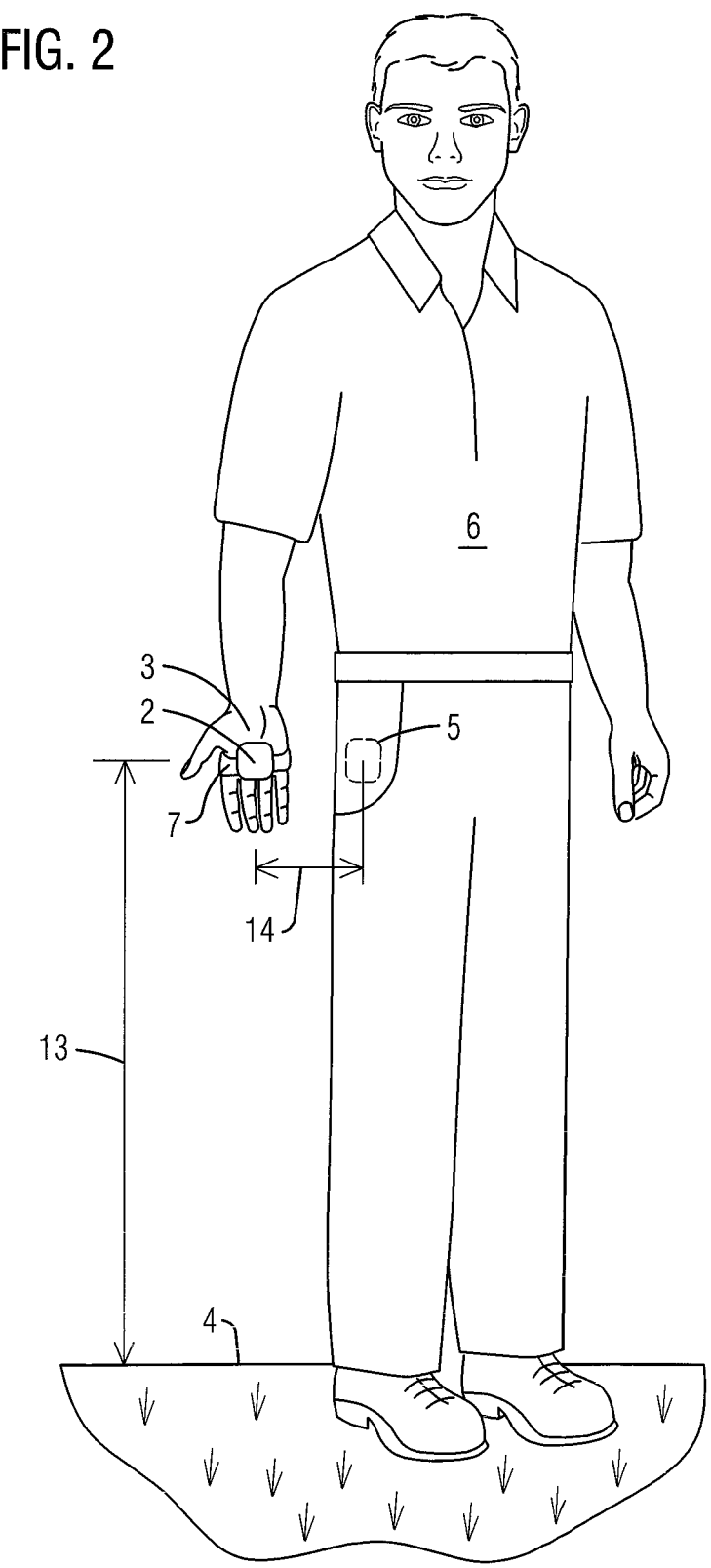
FIG. 2 is a front view of a virtual cane of the present invention in use wherein the handheld sensor is located within an acceptable range of distances from the ground and/or the stationary sensor.

The handheld sensor 2 further comprises at least one constant physical stimulation actuator 11 to provide stimulation or a physical alert to the nerves located in the palm of the hand 3 such as a floating vibration sensor, a vibrating means and so forth. The physical alert is preferably constant, such as a constant or alternating periodic inward pressure on the palm of the hand 3, which occurs when the handheld sensor 2 is located within a predetermined acceptable range of distances from either the ground 4 and/or the stationary sensor 10. As illustrated in FIG. 2, a user's hand 3 and attached handheld sensor 2 is inside of a first acceptable range of distance 13 from the ground 4 and inside a second acceptable range of distance 14 from the stationary sensor 10. Therefore, the at least one constant physical stimulation actuator 11 is activated to mimic the feeling of a conventional cane being held in the user's hand 3 in a stable position against the ground 4.

Figure 3:
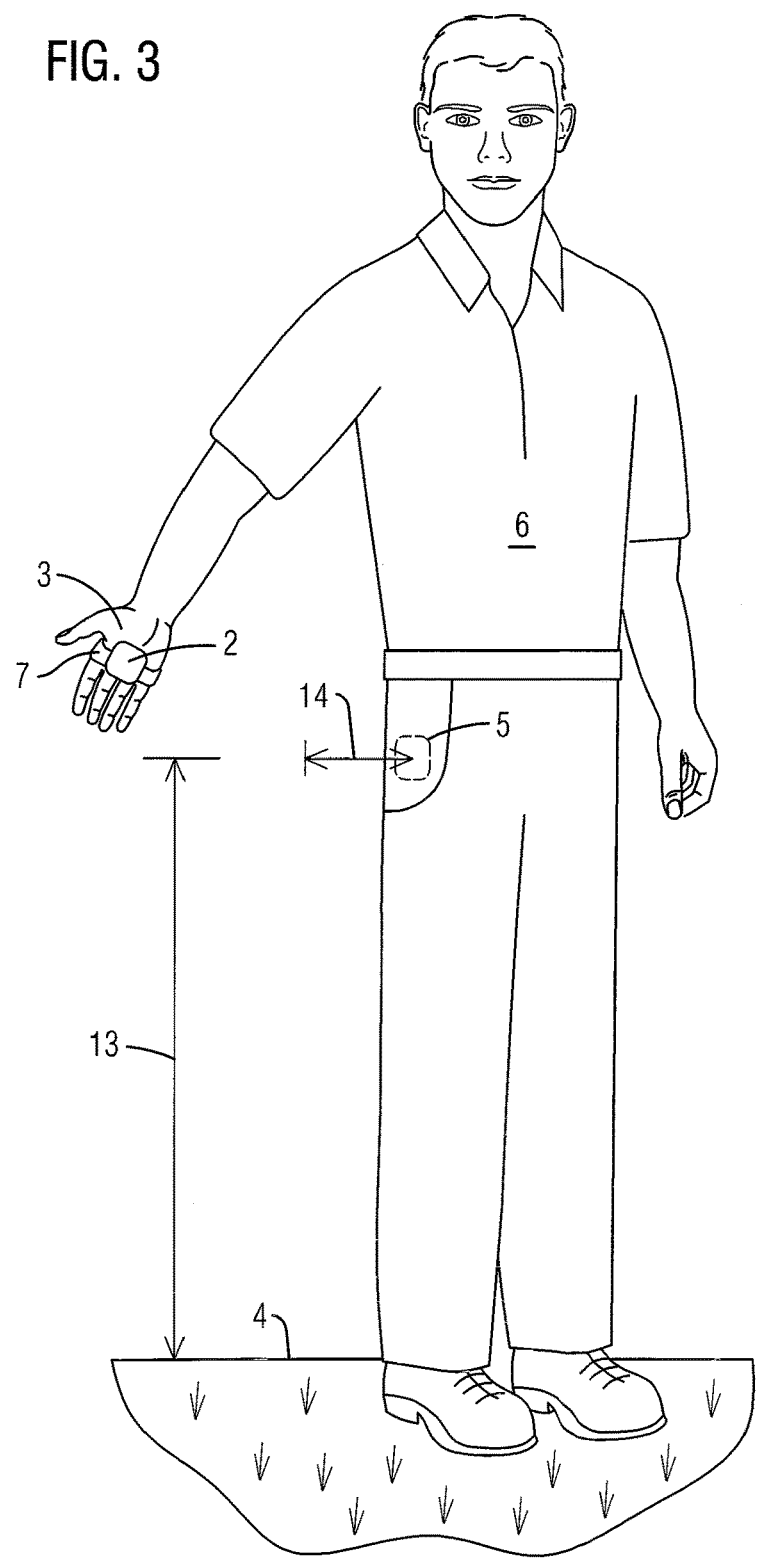
FIG. 3 is a front view of a virtual cane of the present invention in use wherein the handheld sensor is located outside of an acceptable range of distances from the ground and/or the stationary sensor.

The handheld sensor 2 further comprises at least one intermittent physical stimulation actuator 12 to provide stimulation or a physical alert to the nerves located in the palm of the hand 3, such as a floating vibration sensor, a vibrating means and so forth. The physical alert may be a vibration, which occurs when the handheld sensor 2 is located outside of a predetermined acceptable range of distances from either the ground 4 and/or the stationary sensor 10. As illustrated in FIG. 3, a user's hand 3 and attached handheld sensor 2 is outside of a first acceptable range of distance 13 from the ground 4 and outside a second acceptable range of distance 14 from the stationary sensor 10. Therefore, the at least one intermittent physical stimulation actuator 12 is activated to mimic the feeling of a conventional cane being held in the user's hand 3 in an unstable position against the ground 4, thereby allowing the user to correct his or her stance to reduce the likelihood of a fall.

Figure 4:
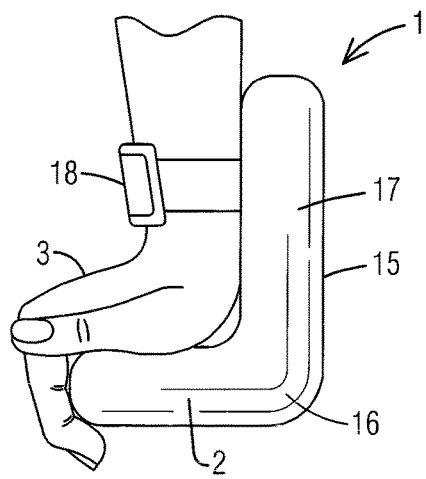
FIG. 4 is a front view of a virtual cane of the present having a J-shaped hook as a handheld sensor that attaches to a user's wrist.

With reference to FIG. 4, a virtual cane 1 of the present invention comprises a handheld sensor 2 that determines a position of the user's hand 3 in relation to the ground 4 and/or to a fixed point of reference 5 on a user's body 6. The handheld sensor 2 may be a substantially J-shaped hook 15 having a curved portion 16 that fits into a user's palm and a straight portion 17 that rests against the user's wrist. The straight portion 17 may be secured to the wrist via a strap or connected to a watch 18, such as a smart watch.

Figure 5:
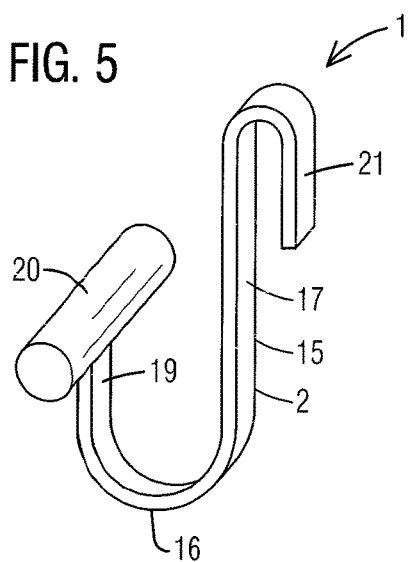
FIG. 5 is a front view of a virtual cane of the present having a J-shaped hook as a handheld sensor that attaches to a user's belt.

With reference to FIG. 5, a virtual cane 1 of the present invention comprises a handheld a substantially J-shaped hook 15 having a curved portion 16 with a distal end 19 having a handle 20 located thereon that fits into a user's palm and a straight portion 17 that attaches to a user's pants and/or belt via an attachment means 21, such as a clip. The physical pressure of resting a user's hand on the handle 20 mimics the feeling of a conventional cane being held in the user's hand It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:
1. A virtual cane comprising;
   a strap for holding the virtual cane against a user's hand;
   at least one ground sensor and at least one body sensor connected to said strap;
   said at least one ground sensor being for determining a distance of the virtual cane in relation to ground located beneath the user's feet on an ongoing reoccurring basis;
   at least one constant physical stimulation actuator connected to said at least one ground sensor;

said at least one body sensor being for determining a distance of the virtual cane in relation to a stationary sensor located on the user's body on an ongoing reoccurring basis;

at least one intermittent physical stimulation actuator connected to said at least one body sensor;

wherein said at least one constant physical stimulation actuator providing a constant physical alert to the user's hand when the virtual cane is inside of a predetermined acceptable range of distance from the ground located beneath the user's feet and a predetermined range of distance from the stationary sensor; and wherein said at least one intermittent physical stimulation actuator providing an intermediate physical alert to the user's hand when the virtual cane is outside of a predetermined acceptable range of distance from the stationary sensor located on the user's body and the predetermined range of distance from the ground located beneath the user's feet.

* * * * *